March 31, 1959      K. GROSSKOPF      2,880,072
METHOD OF DETERMINING CARBON DIOXIDE IN GASES
Filed Aug. 2, 1956
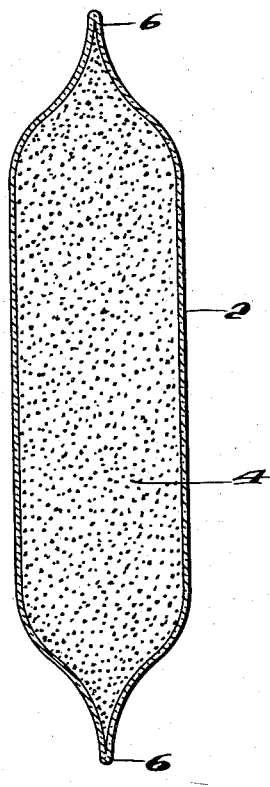
INVENTOR
KARL GROSSKOPF,
BY
ATTORNEYS

United States Patent Office 2,880,072
Patented Mar. 31, 1959

2,880,072

METHOD OF DETERMINING CARBON DIOXIDE IN GASES

Karl Grosskopf, Lubeck, Germany, assignor to Otto Heinrich Drager, Lubeck, Germany Application August 2, 1956, Serial No. 601,833

Claims priority, application Germany August 12, 1955

6 Claims. (Cl. 23—232)

This invention relates to a method for determining the content of carbon dioxide in the air or in other gases.

The known methods for determining the content of carbon dioxide in air are based on the color change occurring in the acid and basic indicators. However, such determination is nonspecific, and presupposes the absence of other acidic or basic gases or vapors. Moreover, it is difficult to deposit such indicators on carrier bodies which are contained in known testing tube gas detectors, because the known carrier bodies are not sufficiently inert with respect to the indicators.

A known method for specifically determining the content of carbon dioxide in the air employs for the reagent an alkaline, alcoholic solution of an organic amine and 2.4 dinitrophenyl-hydrazine. The alkali and other reagents are contained in separate ampoules which are mounted in a testing tube containing a ceramic carrier body. In carrying out the test, the ampoules are opened by means of a shattering thorn so as to permit the contents of the ampoules to flow onto the carrier body. This method, however, is cumbersome because of the separate containers for the solutions.

The object of this invention is to overcome the disadvantages of the prior methods. This object is achieved by using a specific reagent deposited on a carrier body which is placed in a testing tube. The specific reagent consists of hydrazine and a redox or reduction-oxidation indicator, for example triphenylmethane dye, preferably methyl violet. Moreover, it is suitable to employ glycol as a solvent for the reduction-oxidation dye, but often multiple alcohols such as glycerin can also be used.

The means by which the object of the invention is obtained is described more fully with respect to the accompanying drawing, which shows a cross-sectional view through the gas detecting tube.

A glass testing tube 2 has grains of ceramic material placed therein to form a gas pervious carrier body 4. This body is then impregnated with the specific reagent, and then the ends 6 of the tube 2 are closed and sealed.

In use, the ends 6 are broken off, and the gas to be detected then drawn through the tube by conventional suction means.

To the extent that the hydrazine does not react with the carbon dioxide when the hydrazine is present in excess, the indicator is in reduced, mostly colorless state. When the hydrazine is consumed by the carbon dioxide, the indicator becomes colored. The coloring, or the change in color, respectively, depends on the quantity of carbon dioxide, but can always be clearly observed. Such quantity of carbon dioxide can be accurately determined by measuring the quantity of air drawn through the testing tube and the degree of changes in color.

An example is given to show the use of the method by means of a testing tube.

The ceramic carrier body consists of grains of calcium aluminum silicate of, preferably, a particle size of 0.2–0.6 mm., and is impregnated by a solution of 0.5 percent of methyl violet in glycol so that 100 g. of the carrier body contains 4 cm.$^3$ of the solution. This material is further impregnated with 2 cm.$^3$ of 80 percent hydrazine, and placed in the testing tube which is, then, sealed off.

When a certain quantity of air containing carbon dioxide is drawn through the testing tube, sharply separated areas of different color appear in the material therein, the length of the color areas indicating the concentration of carbon dioxide in the air.

The range of measurement can be adjusted at will by varying the amount of hydrazine. For example, the preparation described in the above example covers a range of concentration of 0.5–5.0 percent of carbon dioxide in the air.

Having now described the means by which the object of the invention is obtained,

I claim:

1. A method for determining the content of carbon dioxide in the air and in other gases comprising contacting the gas with a solid carrier impregnated with a reagent composed of hydrazine and a reduction-oxidation colorimetric indicator, and then determining the color changes in the carrier.

2. A composition for determining the carbon dioxide content in gases comprising a solid carrier impregnated with a mixture of hydrazine and a redox indicator.

3. A composition as in claim 2, said solid carrier comprising grains of calcium aluminum silicate.

4. A method for determining the content of carbon dioxide in the air and in other gases comprising contacting the gas with a solid carrier impregnated with a reagent composed of hydrazine and a reduction-oxidation colorimetric indicator consisting of a triphenylmethane dye, and then determining the color changes in the carrier.

5. A method as in claim 4, further comprising a solvent for the triphenylmethane dye composed of a multiple alcohol.

6. A method as in claim 4, said dye comprising methyl violet.

References Cited in the file of this patent

UNITED STATES PATENTS 2,487,077   Shepherd _____ Nov. 8, 1949

OTHER REFERENCES

Audrieth et al.: "The Chemistry of Hydrazine," John Wiley and Sons, Inc., N.Y., 1951, pp. 211–212.

Cohn: "Indicators and Test Papers," John Wiley and Sons, Inc., N.Y., 1899, page 119.